United States Patent
Yoon et al.

(10) Patent No.: US 10,516,468 B2
(45) Date of Patent: Dec. 24, 2019

(54) MECHANISMS FOR SINGLE FREQUENCY NETWORKS IN HIGH-SPEED MOBILE SCENARIOS

(71) Applicant: Intel IP Corporation, Santa Clara, CA (US)

(72) Inventors: Dae Jung Yoon, Santa Clara, CA (US); Andrey Chervyakov, Nizhny Novgorod (RU); Shuang Tian, Santa Clara, CA (US); Yang Tang, San Jose, CA (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 15/772,473

(22) PCT Filed: Apr. 1, 2016

(86) PCT No.: PCT/US2016/025734
§ 371 (c)(1),
(2) Date: Apr. 30, 2018

(87) PCT Pub. No.: WO2017/082951
PCT Pub. Date: May 18, 2017

(65) Prior Publication Data
US 2018/0316409 A1    Nov. 1, 2018

Related U.S. Application Data

(60) Provisional application No. 62/253,056, filed on Nov. 9, 2015.

(51) Int. Cl.
*H04B 7/08*    (2006.01)
*H04B 7/022*    (2017.01)
(Continued)

(52) U.S. Cl.
CPC .......... *H04B 7/0888* (2013.01); *H04B 7/022* (2013.01); *H04B 7/0413* (2013.01);
(Continued)

(58) Field of Classification Search
CPC combination set(s) only.
See application file for complete search history.

(56) References Cited

U.S. PATENT DOCUMENTS

| | | | | |
|---|---|---|---|---|
| 2008/0092194 A1* | 4/2008 | Kim | ...................... | H01Q 25/00 725/131 |
| 2008/0268887 A1* | 10/2008 | Jansen | ................... | H04B 7/022 455/503 |

(Continued)

OTHER PUBLICATIONS

3GPP TSG RAN WG1 #66; (R1-112512) Samsung: Discussion on the Specification Impact of CoMP; Athens, Greece; 2011, Aug. 22-26.

(Continued)

*Primary Examiner* — Linda Wong
(74) *Attorney, Agent, or Firm* — Thorpe North & Western

(57) ABSTRACT

Technologies described herein provide mechanisms for a legacy UE traveling at a high speed (e.g., in a high speed train) to estimate the opposite Doppler shifts separately for different RRHs in an SFN so that the UE can more effectively receive a payload assigned by the SFN. In addition, the present disclosure provides UE signal process mechanisms to improve HST receiver performance such that good demodulation performance can be achieved without significant impacts on UE implementation. The present disclosure provides a specific framework to improve cellular SFN system operation using a combination of an SFN data signal transmissions from different RRHs and orthogonal non-SFN reference signal transmissions from different RRHs. A UE may estimate a propagation channel for each RRH using a (Continued)

reference signal and use this information to improve the demodulation of the combined SFN data signal.

21 Claims, 10 Drawing Sheets

(51) Int. Cl.
    *H04B 7/0413* (2017.01)
    *H04L 25/02* (2006.01)
    *H04B 7/06* (2006.01)
    *H04L 5/00* (2006.01)
    *H04W 88/08* (2009.01)

(52) U.S. Cl.
    CPC .......... *H04L 5/0044* (2013.01); *H04L 5/0048* (2013.01); *H04L 25/0204* (2013.01); *H04L 25/0224* (2013.01); *H04L 25/0228* (2013.01); *H04B 7/0617* (2013.01); *H04W 88/085* (2013.01)

(56) References Cited

U.S. PATENT DOCUMENTS

| | | | | |
|---|---|---|---|---|
| 2011/0317656 | A1* | 12/2011 | Rajih | H04B 7/024 370/330 |
| 2013/0044840 | A1* | 2/2013 | Yamamoto | H04H 20/22 375/340 |
| 2013/0203447 | A1* | 8/2013 | Hannan | H04W 64/00 455/456.5 |
| 2014/0043988 | A1* | 2/2014 | Chen | H04W 24/00 370/252 |
| 2014/0325084 | A1* | 10/2014 | Allen | H04L 2/46 709/228 |
| 2014/0342682 | A1* | 11/2014 | Kroeger | H04B 7/0845 455/193.1 |
| 2015/0312958 | A1* | 10/2015 | Cheng | H04B 7/0413 370/252 |
| 2016/0081033 | A1* | 3/2016 | Ouchi | H04W 52/146 455/522 |
| 2017/0077968 | A1* | 3/2017 | Hsu | H04B 1/0475 |
| 2017/0078903 | A1* | 3/2017 | Kusashima | H04W 24/10 |
| 2017/0245312 | A1* | 8/2017 | Kalhan | H04W 40/12 |

OTHER PUBLICATIONS

3GPP TSG-RAN WG4 #66; (R4-130234) Intel Corporation: Impact of QCL on the performance of DL CoMP with frequency offset; St. Julian's, Malta; 2013, Jan. 28 through Feb. 1.

* cited by examiner

300

The sequence $\overline{w}_p(i)$ for normal cyclic prefix

| Antenna port $p$ | $[\overline{w}_p(0) \quad \overline{w}_p(1) \quad \overline{w}_p(2) \quad \overline{w}_p(3)]$ |
|---|---|
| 7 | [+1 +1 +1 +1] |
| 8 | [+1 −1 +1 −1] |
| 9 | [+1 +1 +1 +1] |
| 10 | [+1 −1 +1 −1] |
| 11 | [+1 +1 −1 −1] |
| 12 | [−1 −1 +1 +1] |
| 13 | [+1 −1 −1 +1] |
| 14 | [−1 +1 +1 −1] |

FIG. 3

| c2 | t | s | s | c1 | d1 | d1 | c2 | s | s | s | c1 | d1 | d1 |
|----|---|---|---|----|----|----|----|---|---|---|----|----|----|
| t  | t | s | s | s  | s  | s  | s  | s | s | s | s  | s  | s  |
| t  | t | s | s | s  | s  | s  | s  | s | s | s | s  | s  | s  |
| c1 | t | s | s | c2 | s  | s  | c1 | s | s | s | c2 | s  | s  |
| t  | t | s | s | s  | s  | s  | s  | s | s | s | s  | s  | s  |
| t  | t | s | s | s  | d1 | d1 | s  | s | s | s | s  | d1 | d1 |
| c2 | t | s | s | c1 | s  | s  | c2 | s | s | s | c1 | s  | s  |
| t  | t | s | s | s  | s  | s  | s  | s | s | s | s  | s  | s  |
| t  | t | s | s | s  | s  | s  | s  | s | s | s | s  | s  | s  |
| c1 | t | s | s | c2 | s  | s  | c1 | s | s | s | c2 | s  | s  |
| t  | t | s | s | s  | d1 | d1 | s  | s | s | s | s  | d1 | d1 |
| t  | t | s | s | s  | s  | s  | s  | s | s | s | s  | s  | s  |

FIG. 4

MECHANISMS FOR SINGLE FREQUENCY NETWORKS IN HIGH-SPEED MOBILE SCENARIOS

BACKGROUND

Wireless mobile communication technology uses various standards and protocols to transmit data between a node (e.g., a transmission station) and a wireless device (e.g., a mobile device). Standards and protocols that use orthogonal frequency-division multiplexing (OFDM) for signal transmission include the third generation partnership project (3GPP) long term evolution (LTE), the Institute of Electrical and Electronics Engineers (IEEE) 802.16 standard (e.g., 802.16e, 802.16m), which is commonly known to industry groups as WiMAX (Worldwide interoperability for Microwave Access), and the IEEE 802.11 standard, which is commonly known to industry groups as WiFi.

In 3GPP radio access network (RAN) LTE systems, the node in an Evolved Universal Terrestrial Radio Access Network (E-UTRAN) system is referred to as an eNode B (also commonly denoted as evolved Node Bs, enhanced Node Bs, eNodeBs, or eNBs), which communicates with the wireless device, known as a user equipment (UE). The downlink (DL) transmission can be a communication from the node (e.g., eNodeB) to the wireless device (e.g., UE), and the uplink (UL) transmission can be a communication from the wireless device to the node.

In LTE, data can be transmitted from the eNodeB to the UE via a physical downlink shared channel (PDSCH). A physical uplink control channel (PUCCH) can be used to acknowledge that data was received. Downlink and uplink channels or transmissions can use time-division duplexing (TDD) or frequency-division duplexing (FDD).

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein:

FIG. 3 provides an example table in which UERS antenna ports are coded by orthogonal codes in accordance with an example;

FIG. 4 provides an example mapping that illustrates correlations between time symbols and correlations between frequency symbols in accordance with an example;

Figure 1:
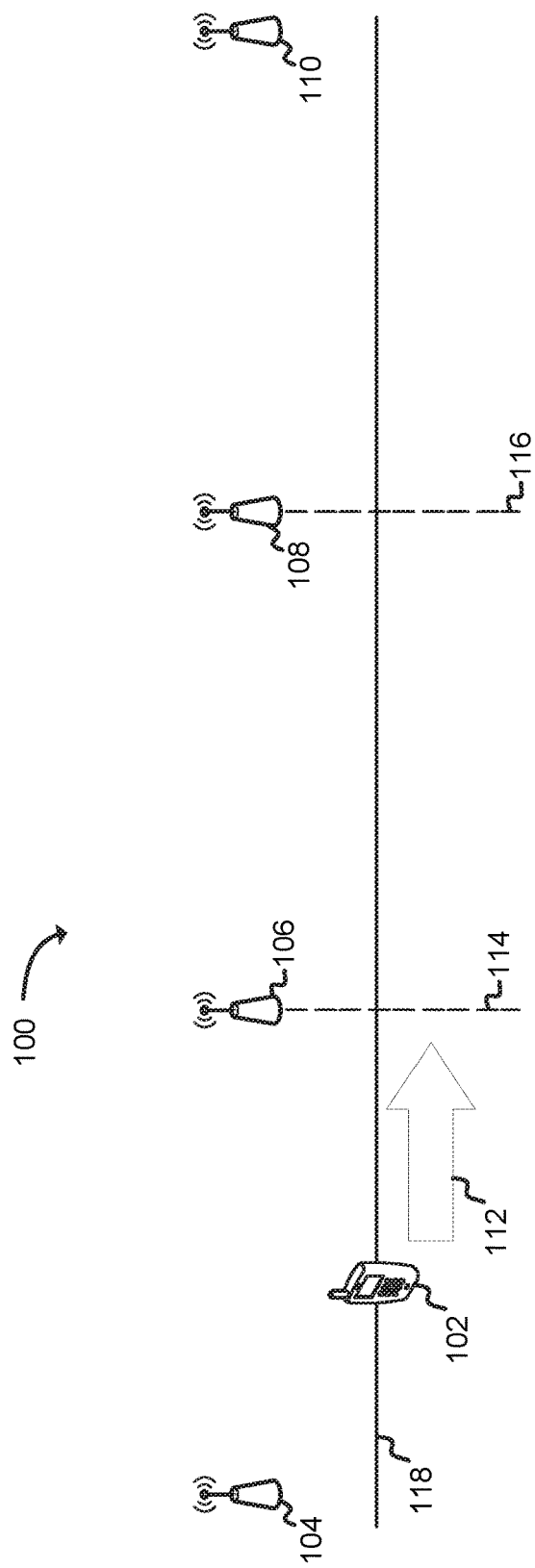
FIG. 1 is a diagram illustrating a scenario in which a UE moving along a trajectory may experience approximately opposite Doppler shifts for signals received from RRHs of an SFN in accordance with an example.

Reference will now be made to the exemplary embodiments illustrated and specific language will be used herein to describe the same. It will nevertheless be understood that no limitation of the scope of is thereby intended.

DETAILED DESCRIPTION

Before some embodiments are disclosed and described, it is to be understood that the claimed subject matter is not limited to the particular structures, process operations, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating operations and do not necessarily indicate a particular order or sequence.

An initial overview of technology embodiments is provided below and then specific technology embodiments are described in further detail later. This initial summary is intended to aid readers in understanding the technology more quickly, but is not intended to identify key features or essential features of the technology nor is it intended to limit the scope of the claimed subject matter.

Cellular communication systems are evolving to provide seamless service under various user conditions like indoor, outdoor, and mobile environments. Technologies provided in the current disclosure focus on the mobile communication mechanisms to enable efficient operation for mobile users and terminals located in the vehicles traveling at high speeds, such as automobiles traveling on a highway or high speed trains (HSTs). Providing mobile communications service to mobile devices moving at speeds of up to 500 km/h speed presents challenges with respect to channel estimation.

The Third Generation Partnership Project (3GPP) has recently created a study item (the High-Speed Train (HST) Study Item (SI)) to identify the new challenges that impact system performance in the HST deployment (3GPP Release 13 "LTE performance enhancement under high speed scenario" SI, RP-142307). The HST SI presents a the high-speed train scenario in a single frequency network (SFN) wherein a mobile device such as a User Equipment (UE) presumptively has a wireless connection to a single base station, but the actual downlink signals are transmitted concurrently in a SFN manner from multiple remote radio heads (RRHs) deployed along the train railways. Such SFN deployment with RRHs along high speed train railways is mainly used to resolve radio-resource management issues that may happen due to frequent handovers between different cells.

Despite the benefits an SFN offers in terms of handover avoidance, UE demodulation performance may significantly degrade when users attempt to receive signals from different RRHs. One reason for this degradation is that there may be a mismatch between Doppler shifts/spreads for signals that originate from RRHs that are deployed in different locations along a UE's path of travel. 3GPP studies have demonstrated that the legacy channel estimation methods (which include Doppler spread/shift estimators) do not work properly under the HST SFN scenarios. In a conventional scenarios, a receive signal originates from a single transmitter and each channel path is characterized by an independent random Doppler shift with a distribution proportional to the Doppler power spectrum. However, in an HST SFN, channel paths may have with approximately opposite Doppler shifts. This is a condition that the legacy UE channel estimator is not designed to accommodate, since the channels from different RRHs may have independent characteristics. To improve demodulation performance, it would be useful for the HST receiver (e.g., a UE) to estimate separate channel characteristics (Doppler shift, Doppler spread, delay spread, delay shift and average signal power) for each RRH channel link.

However, legacy UE implementations cannot properly estimate wireless propagation channel parameters for the signals for each RRH link, since the received signal observed at the UE represents a superposition of the multiple individual signals coming from different RRHs in the SFN. A UE may experience significant performance degradation because of inaccurate channel estimation when using legacy channel estimation mechanisms in an HST SFN scenario. One approach to address this problem would be for the UE to apply advanced channel estimation methods with per channel tap power and delay and frequency offset parameter estimation to improve the channel estimation accuracy. However, in this approach, modifications would have to be made to existing UE channel estimation mechanisms.

FIG. 1 is a diagram 100 illustrating a scenario in which a UE 102 moving in a direction indicated by the arrow 112 along a trajectory 118 may experience approximately opposite Doppler shifts for signals received from RRHs 104, 106, 108, and 110 of an SFN. When the UE 102 is in the position shown and is moving at a high speed in the direction indicated by the arrow 112, a Doppler shift for a signal from the RRH 104 will be in an approximately opposite direction relative to Doppler shifts for signals from the RRHs 106, 108, and 110. When the UE passes the dashed line 114, Doppler shifts for the signal from the RRHs 104 and 106 will be in an approximately opposite direction relative to Doppler shifts for signals from the RRHs 108 and 110. When the UE passes the dashed line 116, Doppler shifts for the signal from the RRHs 101, 106, and 108 will be in an approximately opposite direction relative to the Doppler shift for the signal from the RRH 110. Hence, at different points along the trajectory 118, estimating separate channel characteristics for each of the RRHs 104, 106, 108, and 110 would be helpful.

Various embodiments of technologies of the present disclosure provide mechanisms for a legacy UE to estimate the opposite Doppler shifts separately for RRHs in an SFN. In addition, the present disclosure provides UE signal process mechanisms to improve HST receiver performance. Various embodiments of technologies of the present disclosure can be used to reduce UE implementation complexity for HST applications. Furthermore, various embodiments of technologies of the present disclosure allow reuse of existing channel estimation mechanisms with only slight modifications such that good demodulation performance can be achieved without significant impacts on UE implementation.

Specifically, the present disclosure provides a specific framework to improve cellular SFN system operation using a combination of SFN data signal (e.g. Physical Downlink Shared Channel (PDSCH)) transmissions from different RRHs and orthogonal non-SFN reference signal transmissions from different RRHs. In the latter case, a UE may estimate a propagation channel for each RRH using a reference signal and use this information to improve the demodulation of the combined SFN data signal.

In one example, SFN RRHs can use Demodulation Reference Signal (DMRS) based PDSCH transmission modes (TMs) (e.g., TMs with UE-specific reference signals). The RRHs in an SFN group can transmit the same PDSCH payload simultaneously or concurrently (e.g., using an SFN PDSCH transmission). Different RRHs can transmit reference signals using different orthogonal DRMSs (e.g., by using different Antenna Ports (APs) or scrambling sequences). From the receiver perspective, the PDSCH SFN signal can be represented as a combined signal with PDSCH transmission on different Multiple-Input Multiple-Output (MIMO) layers transmitted with corresponding UE reference signals (UERSs). An HST receiver can select a layer with a dominant Signal-to-Noise Ratio (SNR) or signal quality. Alternatively, the HST receiver (e.g., a UE) can combine the multiple layer signal for performance improvement.

The orthogonality of UE-specific reference signals (e.g., DMRSs) which are used for the DMRS-based PDSCH transmission modes (TMs) (e.g. TMs 8, 9, 10) can be harnessed to enable a UE to estimate a propagation channel for each RRH. The DMRS signals corresponding to different layers/antenna ports (APs) can be coded by an orthogonal code. Each layer/AP can be assigned to a different RRH that is expected to transmit SFN data to the UE. A practical implementation can be made with TM 8, TM 9, or TM 10, for example.

RRHs that are associated with an evolved Node B (eNB) (or another type of cellular base station) in an SFN can be configured to use DMRS-based PDSCH transmission modes (e.g. TM 8, 9 or 10). Different RRHs can transmit an SFN PDSCH with the same payload using different DMRS APs (e.g., Long-Term Evolution (LTE) APs 7-14). Each RRH can transmit the PDSCH to the receiver (e.g., a UE) using a different layer through a different AP. Different RRHs may transmit DMRSs for different DMRS APs. Alternatively different RRHs may use different scrambling sequences for the DMRS transmissions (e.g., a Scrambling Identity (nSCID), a Physical Cell Identity (PCID) value, or a Virtual Cell Identity (VCID) value).

The UE can receive a superposition of the signals from the different RRHs. The receiver can demodulate the reference Signal (RS) in each AP by following the legacy RS demodulation procedure. Channel parameters for signals from different RRHs can be separately estimated at the UE using the demodulated DMRS for each AP.

Different approaches for the signal demodulation can be used. In one approach (option 1), interference rejection combination (IRC) can be used such that the receiver utilizes a strong power channel link for the data signal demodulation and suppresses the other link signals as interference. In another approach (Option 2), the receiver can combine the multiple layer signals from the different RRHs in the SFN. The receiver can perform Multiple-Input Multiple-Output (MIMO) demodulation processing under the assumption of a multi-layer reception (RX) signal (e.g., minimum mean-square error (MMSE)). Then, the receiver can combine the demodulated signals from the different MIMO layers (which are actually from different RRHs). The receiver can combine the demodulated signals at a Quadrature Amplitude Modulation (QAM) symbol level after data demodulation processing or the receiver can combine signals at the soft bit level after data detection processing. In another approach (Option 3), the receiver can use the estimates of the channels from each RRH to estimate the combined SFN channel and then perform conventional RX processing of the combined receive signal.

In order to apprise a UE of when it is prudent to apply these approaches, an eNB may provide Radio Resource Control (RRC) signaling to indicate that the UE is under HST conditions and that SFN transmission (e.g., from multiple RRHs) is being used to serve the UE. Upon being apprised of the fact that the UE is under HST conditions, the UE may activate the approaches described herein (e.g., options 1-3) in order to estimate the channels for different RRHs. In addition, In order to serve a high speed UE, random beamforming may be used (though closed-loop beamforming is not precluded). The approaches described herein can also be used for an enhanced Physical Downlink Control Channel (EPDCCH).

Figure 2:
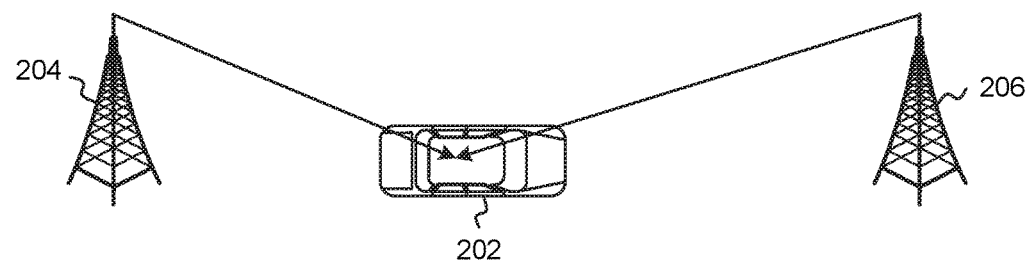
FIG. 2 provides a diagram of an example two-path channel model for a UE that is moving at a high speed in accordance with an example.

FIG. 2 provides a diagram of an example two-path channel model for a UE that is moving at a high speed. A UE may be located in an automobile 202 that is traveling along a high way between the RRH 204 and the RRH 206 of an SFN that is serving the UE. A simple model of a line of sight (LOS) channel can be depicted with the equations:

$$h_{t=0} = h_1 \cdot e^{j \cdot 2\pi f_1 \cdot 0} \cdot \delta(\tau - \tau_1) + h_2 \cdot e^{j \cdot 2\pi f_2 \cdot 0} \cdot \delta(\tau - \tau_2)$$

$$h_{t=\Delta T} = h_1 \cdot e^{j \cdot 2\pi f_1 \cdot \Delta T} \cdot \delta(\tau - \tau_1 + \Delta T) + h_2 \cdot e^{j \cdot 2\pi f_2 \cdot \Delta T} \cdot \delta(\tau - \tau_2 - \Delta T),$$

where $\tau_1$ and $\tau_2$ are arrival timings from RRH 204 and RRH 206, respectively, $f_1$, $f_2$ are Doppler shifts from the RRH 204 and the RRH 206, respectively, $\Delta T$ is an observation time difference, j is the imaginary number equal to the square root of negative one, e is the base of the natural logarithm, π is the ratio of a circle's circumference to the circle's diameter, δ is the Dirac delta function, $h_t$ is a received signal at a time t, $h_1$ is a received signal from the RRH 204, and $h_2$ is a received signal from the RRH 206. If the automobile 202 is directly in between the RRH 204 and the RRH 206, $f_1 = -f_2$. In other words, in the extreme case, the UE 202 experiences two opposite Doppler shifts from the RRH 204 and the RRH 206.

To the UE 202, a channel to the UE 202 can appear as a superposition of $h_1$ and $h_2$. Legacy channel estimation handles this superposition of signals, though, as a single channel propagation from one transmission point. If the carrier frequency used is 3 gigahertz (GHz) and the automobile 202 were replaced by a high speed train traveling at speed of 350 kilometers per hour (km/h), the Doppler shift would be approximately 800 hertz (Hz) for each of the RRHs 204 and 206. Since the Doppler shifts for the RRHs 204 and 206 are in opposite directions, the Doppler spread between the RRHs 204 and 206 can be up to 1.6 kilohertz (KHz). A Doppler spread of this magnitude is significant if 15 KHz subcarrier spacing is assumed.

The UE can compensate for the Doppler shift by manipulating the phase in the frequency domain. In fact, the Doppler shift can be handled as a frequency offset. Secondarily, a channel estimator can address Doppler spread using timing domain interpolation. In either case, though, the UE that is the receiver can execute compensation based on separately estimated channel parameters for each transmission point. Without such separately estimated channel parameters, there is not an immediate way for the UE to make such a compensation.

FIG. 3 provides an example table 300 in which UERS antenna ports are coded by orthogonal codes. By utilizing the antenna ports, the RRHs 204 and 206 in FIG. 2 can transmit according to the following equation:

$$Y_{DMRS} = \sum_{i=0}^{nRRH-1} H_i P_i \overline{w}_{p=7+(i \bmod N_{RRHset})} \circ \overline{s}_{DMRS} + \overline{n},$$

where $Y_{DMRS}$ signifies received DMRS signals in frequency domain, w is an orthogonal code between p=i and p=k from FIG. 2, and $N_{RRHset}$ is the number of RRHs in the deployment sustaining code orthogonality. P is a precoder in each of the RRHs 204 and 206, H is a MIMO channel, $\overline{s}_{DMRS}$ is a DMRS reference sequence vector over multiple consecutive time-domain symbols, '∘' notation means a Hadamard product between vectors, and $\overline{n}$ is an Additive White Gaussian Noise (AWGN) vector over the Orthogonal Frequency Division Multiplexing (OFDM) symbols.

If each of the RRHs 204, 206 utilizes an identical scrambling seed (such as nSCID, PCID, or VCID values), then identical DMRS reference sequences $\overline{s}_{DMRS}$ are transmitted from the RRHs 204, 206 and DMRS APs will be orthogonal between UERS APs. If the RRHs 204, 206 utilize different scrambling seeds, then the $\overline{s}_{DMRS-RRH\ i}$ is also generated differently in each RRH I and the $\overline{s}_{DMRS-RRH\ i}$ and $\overline{s}_{DMRS-RRH\ k}$ (i≠k) are semi-orthogonal by the pseudo random sequence property.

On the receiver side, UERS antenna ports can be demodulated per an AP as $$H_{DMRS-RRH_i} = \frac{1}{N_{code}} Y_{DMRS} [\overline{w}_{p=7+(i \bmod N_{RRHset})} \circ \overline{s}_{DMRS}]^H$$

where $N_{code}$ is a length of an orthogonal codeword and H is the Hermetian transform. For instance, assume an SFN deployment as shown in FIG. 1. Two RRHs in the SFN (e.g., RRHs 104 and 108) can transmit using antenna port 7 and two RRHs (e.g., RRHs 106 and 110) can transmit using antenna port 8. The transmitted signal of a DMRS per RRH can be expressed as $$Y_{DMRS-RRH1} = H_1 P_1 [1\ 1] \circ [s_1, s_2] \text{ for AP 7 and}$$

$$Y_{DMRS-RRH2} = H_2 P_2 [1\ -1] \circ [s_1, s_2] \text{ for AP 8,}$$

where [$s_1\ s_2$] is loaded in two OFDM symbols in the time domain in the DMRS symbols. The receiver (e.g., UE) can receive $Y_{DMRS} = Y_{DMRS-RRH1} + Y_{DMRS-RRH\ 2} + \overline{n}$, (i.e., that is (number of RX)×(2 DMRS symbols)), and can demodulate according to the equations:

$$\frac{1}{2} Y_{DMRS} [s_1, s_2]^H = H_1 P_1 + \frac{1}{2} \overline{n} [s_1, s_2]^H @ H_{DMRS-RRH_2}, \text{ and}$$

$$\frac{1}{2} Y_{DMRS} [s_1, -s_2]^H = H_2 P_2 + \frac{1}{2} \overline{n} [s_1, -s_2]^H @ H_{DMRS-RRH_2}$$

Per these equations, demodulation of each antenna port can provide a separate channel estimate for each RRH transmission link.

Once RS symbols (e.g., DMRS symbols) are demodulated for each AP, parameter estimation for each AP is possible. An estimator applied by the receiver can investigate the correlations between time symbols or between frequency symbols as shown in FIG. 4.

FIG. 4 provides an example mapping 400 that illustrates correlations between time symbols and correlations between frequency symbols. Units of the horizontal axis can represent time, while units of the vertical axis can represent frequency. The resource element that is at row 406 and at column 402 can have a time-symbol correlation with the resource element that is at row 406 and at column 404. The resource element that is at row 406 and at column 402 can have a frequency-symbol correlation with the resource element that is at row 408 and at column 402.

In general, a legacy UE takes an average over samples of all APs for correlation computation, since it assumes that channel characteristics are identical among APs. In accordance with technologies of the present disclosure, a UE can separately compute the correlation for different channel characteristics on a per-RRH link basis.

In another example, a UE can also be configured to apply estimated channel parameters for RRHs separately in cell-specific reference signals (CRS)-based PDSCH TMs. HST RRHs can be configured to transmit data (PDSCH) signals in an SFN manner. The cell-specific reference signals (CRS) transmissions, however, can be done in a non-SFN manner. In one option, different resource elements (REs) can be used for CRS transmissions from different RRHs. For instance, the CRS REs for the given Cell ID can be split into several subsets (e.g., 2 subsets) of REs in a Physical resource Block (PRB) pair. Each RRH can transmit signals on different REs. The UE can estimate the channel characteristics for each RRH using information about the subset of REs used for each transmission. The information can be conveyed via RRC signaling to the UE or can be pre-configured. In another option, different RRHs may have different Physical Cell IDs for the CRS transmissions. In this case, the UE may have information about those IDs and may use this information to attempt to estimate a respective channel for each RRH independently.

Figure 5:
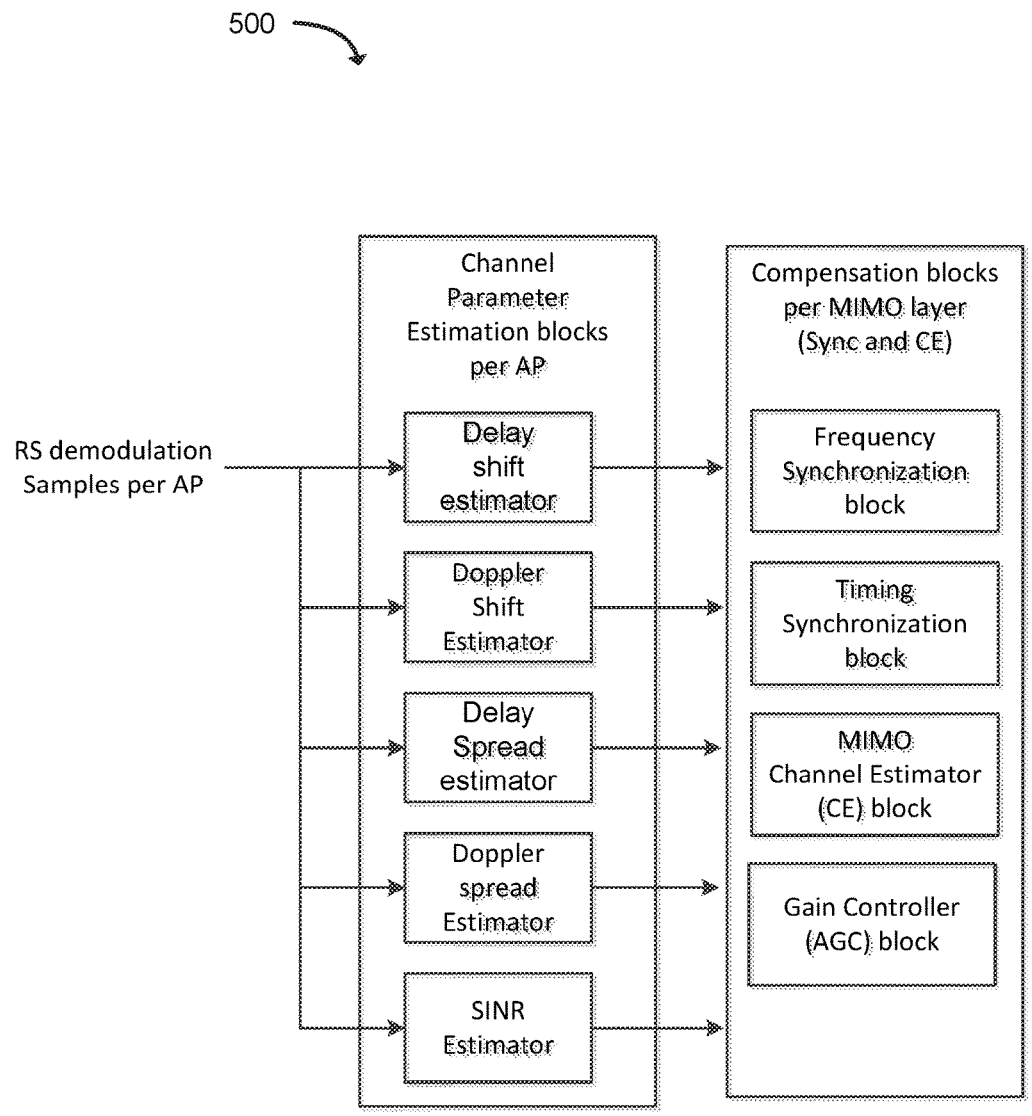
FIG. 5 provides a conceptual diagram of channel parameter estimations and compensation per an antenna port (AP) and a MIMO layer in accordance with an example.

FIG. 5 provides a conceptual diagram 500 of channel parameter estimations and compensation per an antenna port (AP) and a MIMO layer. There are various methods that may be applied to estimate delay shift, Doppler shift, delay spread, Doppler spread, and channel gain. As illustrated in FIG. 5, Reference Signal (RS) demodulation samples that are on a per-AP basis can be used by a delay shift estimator, a Doppler shift estimator, a delay spread estimator, a Doppler spread estimator, and a Signal-to-Interference-plus-noise Ratio estimator. Each of the estimators can provide a corresponding estimate to compensation blocks, such as a frequency synchronization block, a timing synchronization block, a MIMO channel estimator (CE) block, and an automatic gain controller (AGC) block.

Different channel interpolation filters can be applied to each signal corresponding to a respective AP (and therefore RRH). In some examples, some channel parameters can be estimated globally over multiple APs rather than on a per-AP basis. Likewise, compensation and channel estimation can be computed on a per-AP basis or globally over multiple APs.

With regard to information detection mechanisms, there are many variations of detection settings and methods that can improve performance. A first option for a signal model is described by the equation:

$$Y_{data} = H_i P_i s_{data} + \sum_{\substack{j \\ j \neq i}}^{nRRH} H_j P_j s_{data} + n$$

In this first option, $H_i P_i s_{data}$ is the target signal from $RRH_i$, and $$\sum_{\substack{j \\ j \neq i}}^{nRRH} H_j P_j s_{data} + n$$

is the interference plus noise. And a second option for a signal model is described by the equation $$Y = \sum_{i}^{nRRH} H_i P_i s_{data} + n$$

In this second option, $\Sigma_i^{nRRH} H_i P_i s_{data}$ is the target signal, and n is the noise. A third option includes a mixed form of the first and second options. $Y_{Data}$ signifies received data signals in frequency domain, nRRH is the number of RRHs in the deployment from which signals are being sent, and n is noise. $P_i$ and $P_j$ are precoders for RRHs at indices i and j, respectively. $H_i$ and $H_j$ are MIMO channels for RRHs at indices i and j, respectively.

In the first option, it is assumed that only one RRH channel path is valid and other signals are regarded as interference and noise. This option provides benefit when one path has a significantly strong propagation power than other paths and the other paths are too negligible to cause a large channel estimation error. The second option provides benefit when more than one path has a significant valid propagation. Again, a mixed form the first and second options can also be considered as an additional model. Detection methods can be applied based on the first option, the second option, or a model that is a combination of the first and second options. Interference rejection methods also can be applied.

Figure 6:
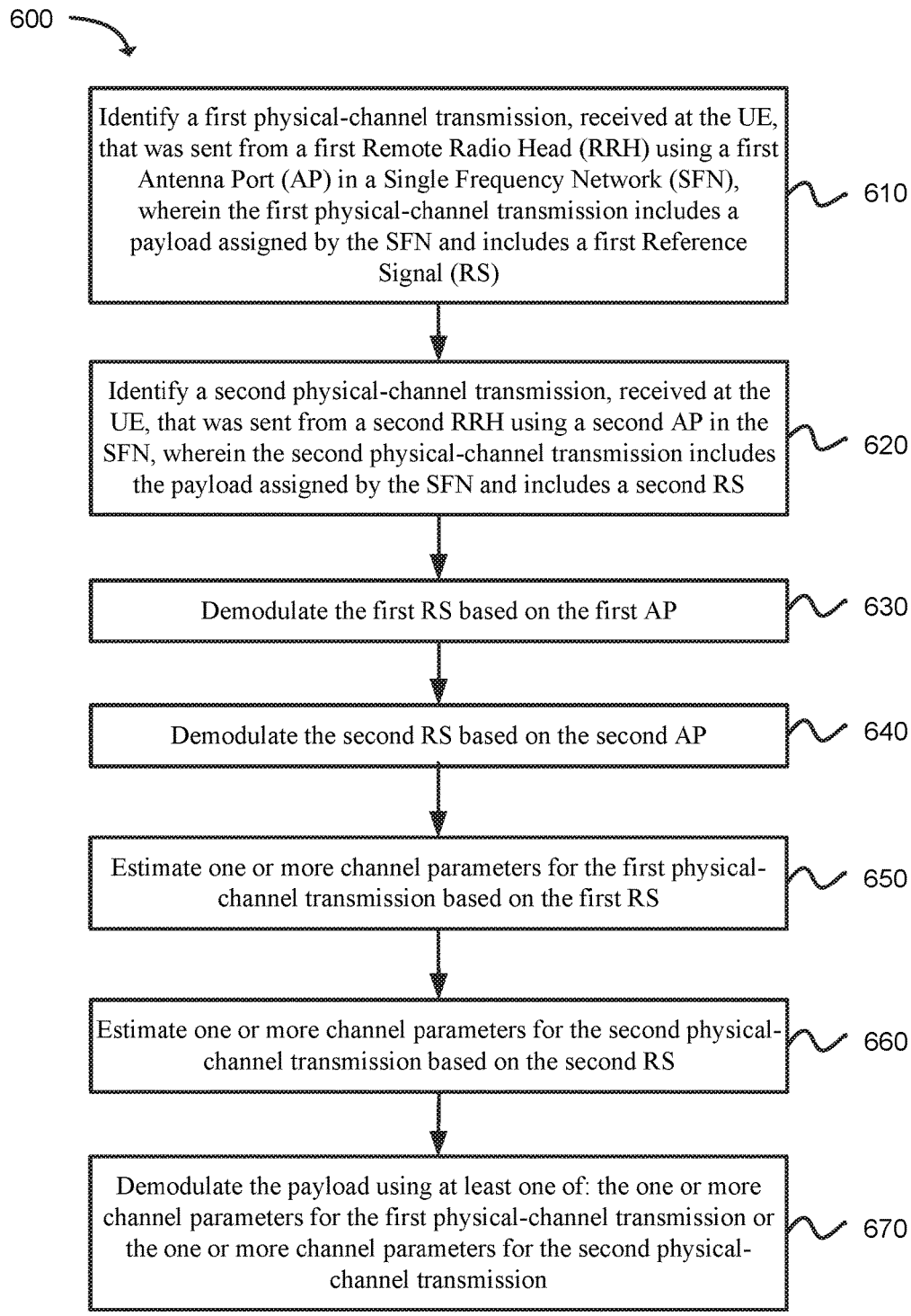
FIG. 6 illustrates functionality of User Equipment (UE) in accordance with an example.

FIG. 6 illustrates functionality 600 of User Equipment (UE) in accordance with an example. The functionality 600 can be implemented as a method or the functionality can be executed as instructions on a machine (e.g., by one or more processors), where the instructions are included on at least one computer-readable storage medium (e.g., a transitory or non-transitory computer-readable storage medium).

As in block 610, the functionality 600 can include identifying a first physical-channel transmission, received at the UE, that was sent from a first Remote Radio Head (RRH) using a first Antenna Port (AP) in a Single Frequency Network (SFN), wherein the first physical-channel transmission includes a payload assigned by the SFN and includes a first Reference Signal (RS). The payload can be a Physical Downlink Shared Channel (PDSCH) payload or an enhanced Physical Downlink Control Channel (ePDCCH) payload.

As in block 620, the functionality 600 can include identifying a second physical-channel transmission, received at the UE, that was sent from a second RRH using a second AP in the SFN, wherein the second physical-channel transmission includes the payload assigned by the SFN and includes a second RS. The first RS and the second RS can be Demodulation Reference Signals (DMRSs), UE-specific Demodulation Reference Signals (UERSs), or Cell-specific Demodulation Reference Signals (CRSs).

As in block 630, the functionality 600 can include demodulating the first RS based on the first AP. In some examples, the first RS can be demodulated based on a first scrambling sequence corresponding to the first AP.

As in block 640, the functionality 600 can include demodulating the second RS based on the second AP. In some examples, the second RS can be demodulated based on a second scrambling sequence corresponding to the second AP In addition, the functionality 600 can include processing a Radio Resource Control (RRC) indicator received from an evolved Node B (eNB), the RRC indicator indicating that the UE is to calculate the one or more channel parameters for the first physical-channel transmission and the one or more channel parameters for the second physical-channel transmission separately based on a motion pattern of the UE.

As in block 650, the functionality 600 can include estimating one or more channel parameters for the first physical-channel transmission based on the first RS.

As in block 660, the functionality 600 can include estimating one or more channel parameters for the second physical-channel transmission based on the second RS.

The one or channel parameters for the first physical-channel transmission or the one or more channel parameters for the second physical-channel transmission can include at least one of: a delay shift, a Doppler shift, a delay spread, a Doppler spread, or a channel gain.

The functionality 600 can also include performing Multiple Input Multiple Output (MIMO) demodulation processing on the first physical-channel transmission using the one or more channel parameters for the first physical-channel transmission to form a first demodulated signal for the payload. In addition, the functionality 600 can include performing MIMO demodulation processing on the second physical-channel transmission using the one or more channel parameters for the second physical-channel transmission to form a second demodulated signal for the payload and combining the first demodulated signal for the payload and the second demodulated signal for the payload at a Quadrature Amplitude Modulation (QAM) symbol level or at a soft bit level to determine the payload with increased accuracy.

As in block 670, the functionality 600 can include demodulating the payload using at least one of: the one or more channel parameters for the first physical-channel transmission or the one or more channel parameters for the second physical-channel transmission.

In addition, the functionality 600 can include determining that a channel link to the first RRH has a higher received power level than a channel link to the second RRH based on the one or more channel parameters for the first physical-channel transmission and based on the one or more channel parameters for the second physical-channel transmission; suppressing the channel link to the second RRH as interference; and demodulating the payload using the one or more channel parameters for the first physical-channel transmission.

Figure 7:
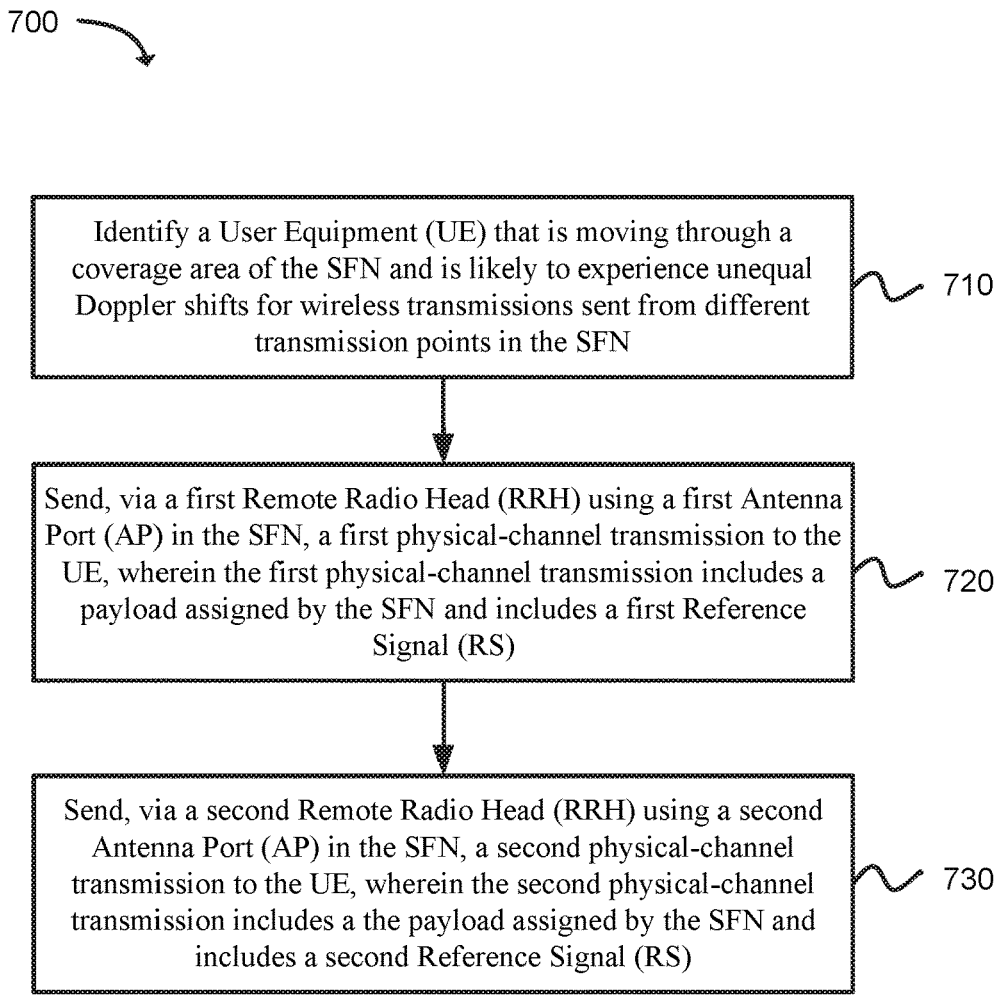
FIG. 7 illustrates functionality of cellular base station (e.g., an evolved Node B) in accordance with an example.

FIG. 7 illustrates functionality 700 of cellular base station (e.g., an evolved Node B) in accordance with an example. The functionality 700 can be implemented as a method or the functionality can be executed as instructions on a machine (e.g., by one or more processors), where the instructions are included on at least one computer-readable storage medium (e.g., a transitory or non-transitory computer-readable storage medium).

As in block 710, the functionality 700 can include identifying a User Equipment (UE) that is moving through a coverage area of the SFN and is likely to experience unequal Doppler shifts for wireless transmissions sent from different transmission points in the SFN.

The functionality 700 can include sending a Radio Resource Control (RRC) indicator to the UE, the RRC indicator indicating that the UE is to estimate one or more channel parameters for the first physical-channel transmission and one or more channel parameters for the second physical-channel transmission separately.

As in block 720, the functionality 700 can include sending, via a first Remote Radio Head (RRH) using a first Antenna Port (AP) in the SFN, a first physical-channel transmission to the UE, wherein the first physical-channel transmission includes a payload assigned by the SFN and includes a first Reference Signal (RS).

As in block 730, the functionality 700 can include sending, via a second Remote Radio Head (RRH) using a second Antenna Port (AP) in the SFN, a second physical-channel transmission to the UE, wherein the second physical-channel transmission includes a the payload assigned by the SFN and includes a second Reference Signal (RS). The payload can be a Physical Downlink Shared Channel (PDSCH) payload or an enhanced Physical Downlink Control Channel (ePDCCH) payload. In addition, the first RS and the second RS can be Demodulation Reference Signals (DMRSs), UE-specific Demodulation Reference Signals (UERSs) or Cell-specific Demodulation Reference Signals (CRSs).

Figure 8:
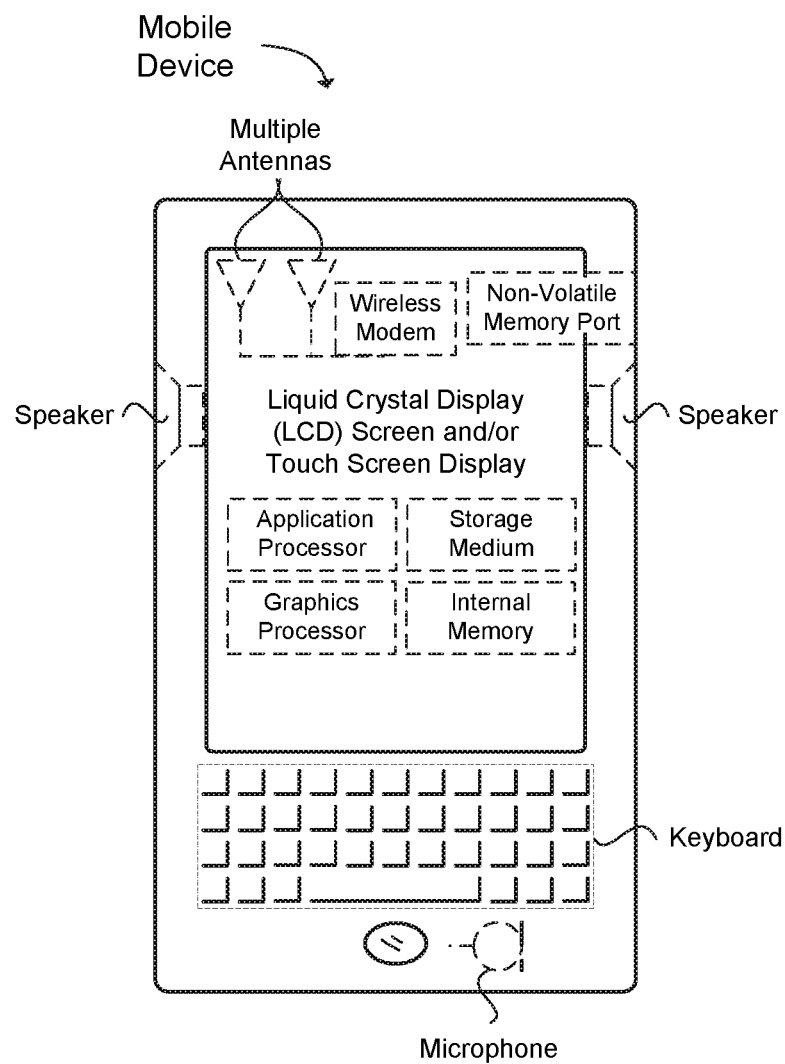
FIG. 8 provides an example illustration of a wireless device in accordance with an example.

FIG. 8 provides an example illustration of a mobile device, such as a user equipment (UE), a mobile station (MS), a mobile wireless device, a mobile communication device, a tablet, a handset, a CIoT device, or other type of wireless device. The mobile device can include one or more antennas configured to communicate with a node, macro node, low power node (LPN), or, transmission station, such as a base station (BS), an evolved Node B (eNB), a baseband processing unit (BBU), a remote radio head (RRH), a remote radio equipment (RRE), a relay station (RS), a radio equipment (RE), or other type of wireless wide area network (WWAN) access point. The mobile device can be configured to communicate using at least one wireless communication standard such as, but not limited to, 3GPP LTE, WiMAX, High Speed Packet Access (HSPA), Bluetooth, and WiFi. The mobile device can communicate using separate antennas for each wireless communication standard or shared antennas for multiple wireless communication standards. The mobile device can communicate in a wireless local area network (WLAN), a wireless personal area network (WPAN), and/or a WWAN.

The mobile device can also comprise a wireless modem. The wireless modem can comprise, for example, a wireless radio transceiver and baseband circuitry (e.g., a baseband processor). The wireless modem can, in one example, modulate signals that the mobile device transmits via the one or more antennas and demodulate signals that the mobile device receives via the one or more antennas.

The mobile device can include a storage medium. In one aspect, the storage medium can be associated with and/or communication with the application processor, the graphics processor, the display, the non-volatile memory port, and/or internal memory. In one aspect, the application processor and graphics processor are storage mediums.

FIG. 8 also provides an illustration of a microphone and one or more speakers that can be used for audio input and output from the mobile device. The display screen can be a liquid crystal display (LCD) screen, or other type of display screen such as an organic light emitting diode (OLED) display. The display screen can be configured as a touch screen. The touch screen can use capacitive, resistive, or another type of touch screen technology. An application processor and a graphics processor can be coupled to internal memory to provide processing and display capabilities. A non-volatile memory port can also be used to provide data input/output options to a user. The non-volatile memory port can also be used to expand the memory capabilities of the mobile device. A keyboard can be integrated with the mobile device or wirelessly connected to the wireless device to provide additional user input. A virtual keyboard can also be provided using the touch screen.

Figure 9:
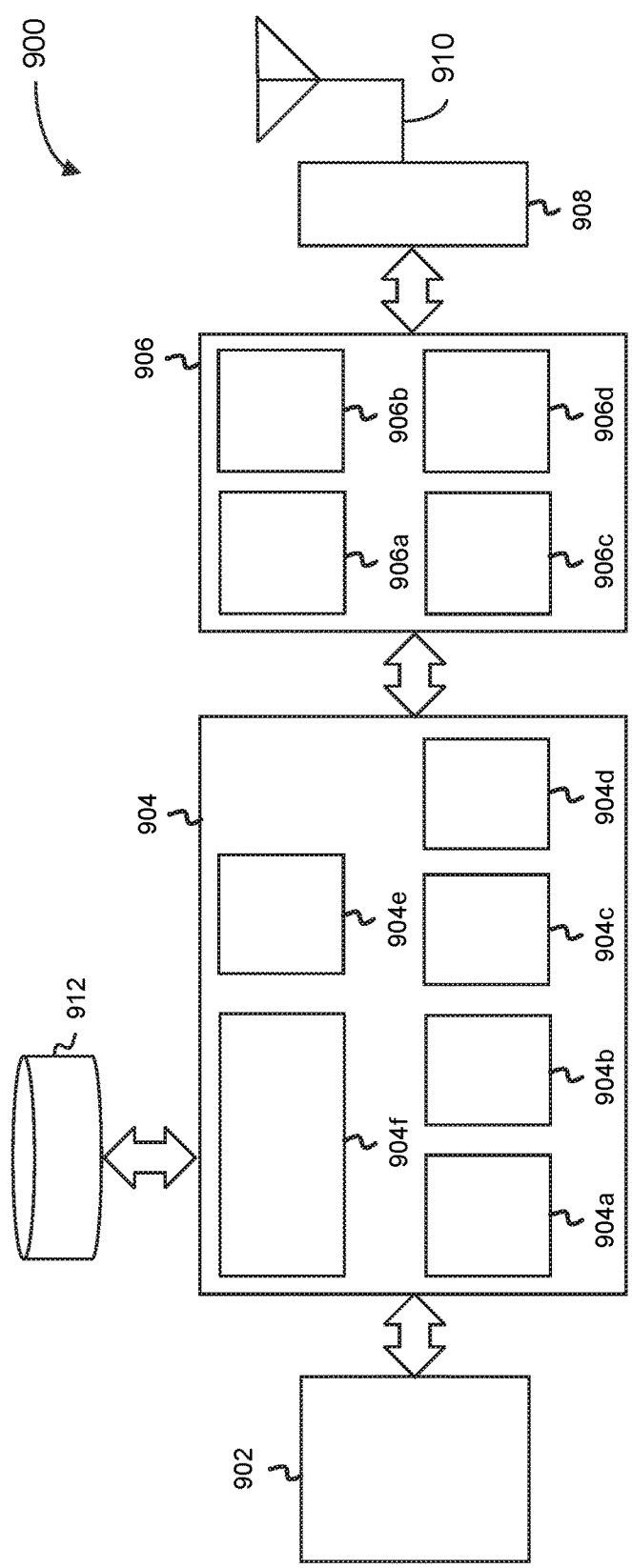
FIG. 9 provides an example illustration of a user equipment (UE) device, such as a wireless device, a mobile station (MS), a mobile wireless device, a mobile communication device, a tablet, a handset, or other type of wireless device.

FIG. 9 provides an example illustration of a user equipment (UE) device 900, such as a wireless device, a mobile station (MS), a mobile wireless device, a mobile communication device, a tablet, a handset, a CIoT device, or other type of wireless device. The UE device 900 can include one or more antennas configured to communicate with a node or transmission station, such as a base station (BS), an evolved Node B (eNB), a baseband unit (BBU), a remote radio head (RRH), a remote radio equipment (RRE), a relay station (RS), a radio equipment (RE), a remote radio unit (RRU), a central processing module (CPM), or other type of wireless wide area network (WWAN) access point. The UE device 900 can be configured to communicate using at least one wireless communication standard such as, but not limited to, 3GPP LTE, WiMAX, High Speed Packet Access (HSPA), Bluetooth, and WiFi. The UE device 900 can communicate using separate antennas for each wireless communication standard or shared antennas for multiple wireless communication standards. The UE device 900 can communicate in a wireless local area network (WLAN), a wireless personal area network (WPAN), and/or a WWAN.

In some embodiments, the UE device 900 may include application circuitry 902, baseband circuitry 904, Radio Frequency (RF) circuitry 906, front-end module (FEM) circuitry 908 and one or more antennas 910, coupled together at least as shown.

The application circuitry 902 may include one or more application processors. For example, the application circuitry 902 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage (e.g., storage medium 912) and may be configured to execute instructions stored in the memory/storage (e.g., storage medium 912) to enable various applications and/or operating systems to run on the system.

The baseband circuitry 904 may include circuitry such as, but not limited to, one or more single-core or multi-core processors. The baseband circuitry 904 may include one or more baseband processors and/or control logic to process baseband signals received from a receive signal path of the RF circuitry 906 and to generate baseband signals for a transmit signal path of the RF circuitry 906. Baseband processing circuitry 904 may interface with the application circuitry 902 for generation and processing of the baseband signals and for controlling operations of the RF circuitry 906. For example, in some embodiments, the baseband circuitry 904 may include a second generation (2G) baseband processor 904a, third generation (3G) baseband processor 904b, fourth generation (4G) baseband processor 904c, and/or other baseband processor(s) 904d for other existing generations, generations in development or to be developed in the future (e.g., fifth generation (5G), 6G, etc.). The baseband circuitry 904 (e.g., one or more of baseband processors 904a-d) may handle various radio control functions that enable communication with one or more radio networks via the RF circuitry 906. The radio control functions may include, but are not limited to, signal modulation/demodulation, encoding/decoding, radio frequency shifting, etc. In some embodiments, modulation/demodulation circuitry of the baseband circuitry 904 may include Fast-Fourier Transform (FFT), precoding, and/or constellation mapping/demapping functionality. In some embodiments, encoding/decoding circuitry of the baseband circuitry 904 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 904 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 904e of the baseband circuitry 904 may be configured to run elements of the protocol stack for signaling of the PHY, MAC, RLC, PDCP and/or RRC layers. In some embodiments, the baseband circuitry may include one or more audio digital signal processor(s) (DSP) 904f. The audio DSP(s) 904f may include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 904 and the application circuitry 902 may be implemented together such as, for example, on a system on a chip (SOC).

In some embodiments, the baseband circuitry 904 may provide for communication compatible with one or more radio technologies. For example, in some embodiments, the baseband circuitry 904 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 904 is configured to support radio communications of more than one wireless protocol may be referred to as multi-mode baseband circuitry.

The RF circuitry 906 may enable communication with wireless networks using modulated electromagnetic radiation through a non-solid medium. In various embodiments, the RF circuitry 906 may include switches, filters, amplifiers, etc. to facilitate the communication with the wireless network. RF circuitry 906 may include a receive signal path which may include circuitry to down-convert RF signals received from the FEM circuitry 908 and provide baseband signals to the baseband circuitry 904. RF circuitry 906 may also include a transmit signal path which may include circuitry to up-convert baseband signals provided by the baseband circuitry 904 and provide RF output signals to the FEM circuitry 908 for transmission.

In some embodiments, the RF circuitry 906 may include a receive signal path and a transmit signal path. The receive signal path of the RF circuitry 906 may include mixer circuitry 906a, amplifier circuitry 906b and filter circuitry 906c. The transmit signal path of the RF circuitry 906 may include filter circuitry 906c and mixer circuitry 906a. RF circuitry 906 may also include synthesizer circuitry 906d for synthesizing a frequency for use by the mixer circuitry 906a of the receive signal path and the transmit signal path. In some embodiments, the mixer circuitry 906a of the receive signal path may be configured to down-convert RF signals received from the FEM circuitry 908 based on the synthesized frequency provided by synthesizer circuitry 906d. The amplifier circuitry 906b may be configured to amplify the down-converted signals and the filter circuitry 906c may be a low-pass filter (LPF) or band-pass filter (BPF) configured to remove unwanted signals from the down-converted signals to generate output baseband signals. Output baseband signals may be provided to the baseband circuitry 904 for further processing. In some embodiments, the output baseband signals may be zero-frequency baseband signals, although other types of baseband signals may be used. In some embodiments, mixer circuitry 906a of the receive signal path may comprise passive mixers, although the scope of the embodiments is not limited in this respect.

In some embodiments, the mixer circuitry 906a of the transmit signal path may be configured to up-convert input baseband signals based on the synthesized frequency provided by the synthesizer circuitry 906d to generate RF output signals for the FEM circuitry 908. The baseband signals may be provided by the baseband circuitry 904 and may be filtered by filter circuitry 906c. The filter circuitry 906c may include a low-pass filter (LPF), although the scope of the embodiments is not limited in this respect.

In some embodiments, the mixer circuitry 906a of the receive signal path and the mixer circuitry 906a of the transmit signal path may include two or more mixers and may be arranged for quadrature down-conversion and/or up-conversion respectively. In some embodiments, the mixer circuitry 906a of the receive signal path and the mixer circuitry 906a of the transmit signal path may include two or more mixers and may be arranged for image rejection (e.g., Hartley image rejection). In some embodiments, the mixer circuitry 906a of the receive signal path and the mixer circuitry 906a may be arranged for direct down-conversion and/or direct up-conversion, respectively. In some embodiments, the mixer circuitry 906a of the receive signal path and the mixer circuitry 906a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 906 may include analog-to-digital converter (ADC) and digital-to-analog converter (DAC) circuitry and the baseband circuitry 904 may include a digital baseband interface to communicate with the RF circuitry 906.

In some dual-mode embodiments, a separate radio IC circuitry may be provided for processing signals for each spectrum, although the scope of the embodiments is not limited in this respect.

In some embodiments, the synthesizer circuitry 906d may be a fractional-N synthesizer or a fractional N/N+1 synthesizer, although the scope of the embodiments is not limited in this respect as other types of frequency synthesizers may be suitable. For example, synthesizer circuitry 906d may be a delta-sigma synthesizer, a frequency multiplier, or a synthesizer comprising a phase-locked loop with a frequency divider.

The synthesizer circuitry 906d may be configured to synthesize an output frequency for use by the mixer circuitry 906a of the RF circuitry 906 based on a frequency input and a divider control input. In some embodiments, the synthesizer circuitry 906d may be a fractional N/N+1 synthesizer.

In some embodiments, frequency input may be provided by a voltage controlled oscillator (VCO), although other types of devices may provide the frequency input. Divider control input may be provided by either the baseband circuitry 904 or the applications processor 902 depending on the desired output frequency. In some embodiments, a divider control input (e.g., N) may be determined from a look-up table based on a channel indicated by the applications processor 902.

Synthesizer circuitry 906d of the RF circuitry 906 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 906d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 906 may include an IQ/polar converter.

FEM circuitry 908 may include a receive signal path which may include circuitry configured to operate on RF signals received from one or more antennas 910, amplify the received signals and provide the amplified versions of the received signals to the RF circuitry 906 for further processing. FEM circuitry 908 may also include a transmit signal path which may include circuitry configured to amplify signals for transmission provided by the RF circuitry 906 for transmission by one or more of the one or more antennas 910.

In some embodiments, the FEM circuitry 908 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 906). The transmit signal path of the FEM circuitry 908 may include a power amplifier (PA) to amplify input RF signals (e.g., provided by RF circuitry 906), and one or more filters to generate RF signals for subsequent transmission (e.g., by one or more of the one or more antennas 910.

In some embodiments, the UE device 900 may include additional elements such as, for example, memory/storage, display (e.g., touch screen), camera, antennas, keyboard, microphone, speakers, sensor, and/or input/output (I/O) interface.

Figure 10:
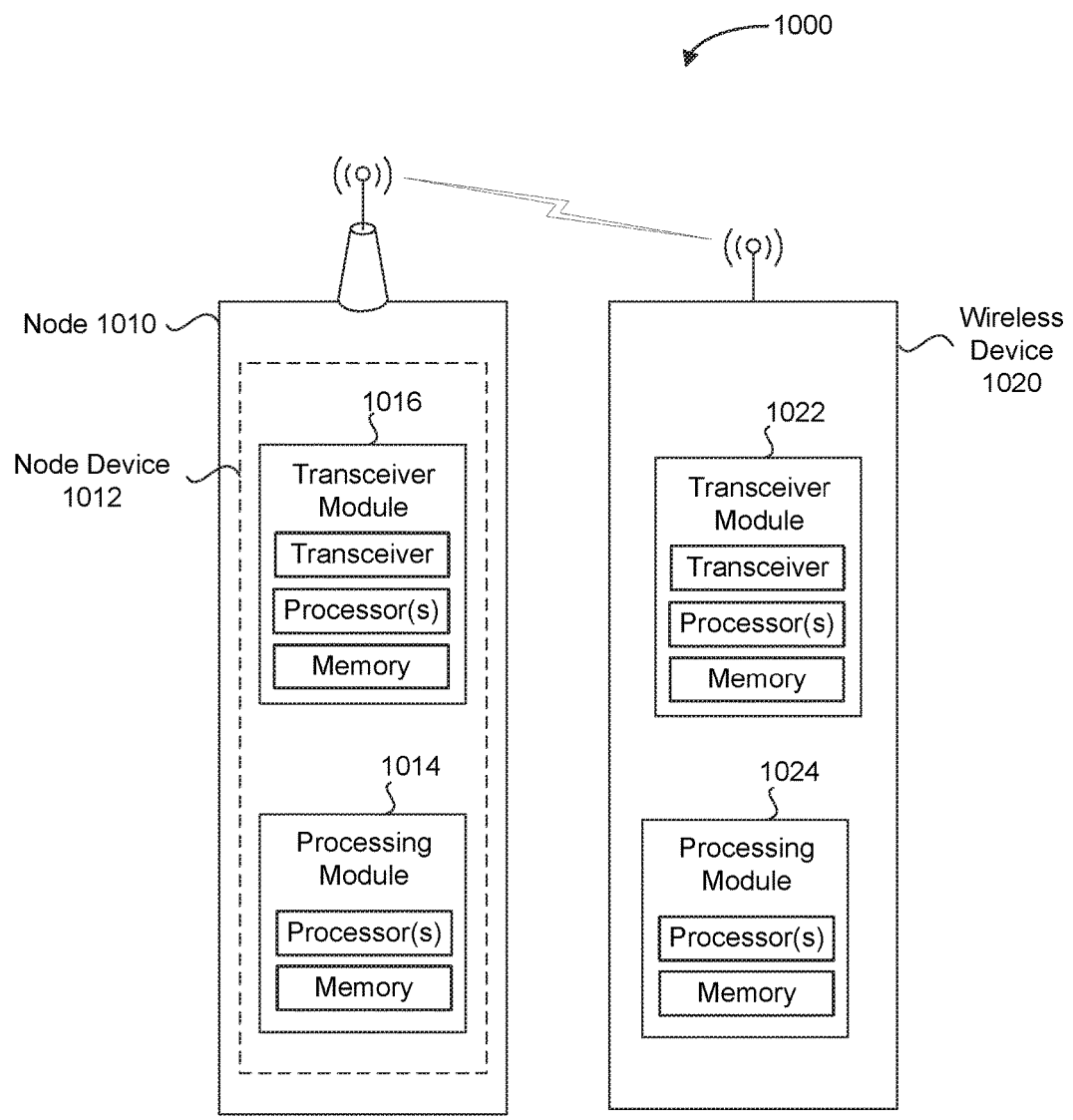
FIG. 10 illustrates a diagram of a node (e.g., eNB and/or a Serving GPRS Support Node) and a wireless device (e.g., UE) in accordance with an example.

FIG. 10 illustrates a diagram 1000 of a node 1010 (e.g., eNB and/or a Serving GPRS Support Node) and a wireless device 1020 (e.g., UE) in accordance with an example. The node can include a base station (BS), a Node B (NB), an evolved Node B (eNB), a baseband unit (BBU), a remote radio head (RRH), a remote radio equipment (RRE), a remote radio unit (RRU), or a central processing module (CPM). In one aspect, the node can be a Serving GPRS Support Node. The node 1010 can include a node device 1012. The node device 1012 or the node 1010 can be configured to communicate with the wireless device 1020. The node device 1012 can be configured to implement technologies described herein. The node device 1012 can include a processing module 1014 and a transceiver module 1016. In one aspect, the node device 1012 can include the transceiver module 1016 and the processing module 1014 forming a circuitry for the node 1010. In one aspect, the transceiver module 1016 and the processing module 1014 can form a circuitry of the node device 1012. The processing module 1014 can include one or more processors and memory. In one embodiment, the processing module 1022 can include one or more application processors. The transceiver module 1016 can include a transceiver and one or more processors and memory. In some examples, components of the transceiver module 1316 can be included in separate devices. For example, selected components of the transceiver module 1316 may be located in a cloud radio access network (C-RAN). In one embodiment, the transceiver module 1016 can include a baseband processor. In some examples, components of the transceiver module 1016 can be included in separate devices.

The wireless device 1020 can include a transceiver module 1024 and a processing module 1022. The processing module 1022 can include one or more processors and memory. In one embodiment, the processing module 1022 can include one or more application processors. The transceiver module 1024 can include a transceiver and one or more processors and memory. In one embodiment, the transceiver module 1024 can include a baseband processor. The wireless device 1020 can be configured to implement technologies described herein. The node 1010 and the wireless devices 1020 can also include one or more storage mediums, such as the transceiver module 1016, 1024 and/or the processing module 1014, 1022.

EXAMPLES

The following examples pertain to specific embodiments and point out specific features, elements, or steps that can be used or otherwise combined in achieving such embodiments.

Example 1 includes an apparatus of a user equipment (UE) comprising one or more processors and memory configured to: identify a first physical-channel transmission, received at the UE, that was sent from a first Remote Radio Head (RRH) using a first Antenna Port (AP) in a Single Frequency Network (SFN), wherein the first physical-channel transmission includes a payload assigned by the SFN and includes a first Reference Signal (RS); identify a second physical-channel transmission, received at the UE, that was sent from a second RRH using a second AP in the SFN, wherein the second physical-channel transmission includes the payload assigned by the SFN and includes a second RS; demodulate the first RS based on the first AP; demodulate the second RS based on the second AP; estimate one or more channel parameters for the first physical-channel transmission based on the first RS; estimate one or more channel parameters for the second physical-channel transmission based on the second RS; and demodulate the payload using at least one of: the one or more channel parameters for the first physical-channel transmission or the one or more channel parameters for the second physical-channel transmission.

In example 2, the subject matter of example 1 or any of the examples described herein may further include that the one or more processors and memory are further configured to: determine that a channel link to the first RRH has a higher received power level than a channel link to the second RRH based on the one or more channel parameters for the first physical-channel transmission and based on the one or more channel parameters for the second physical-channel transmission; suppress the channel link to the second RRH as interference; and demodulate the payload using the one or more channel parameters for the first physical-channel transmission.

In example 3, the subject matter of example 1 or any of the examples described herein may further include that the one or more processors and memory are further configured to: perform Multiple Input Multiple Output (MIMO) demodulation processing on the first physical-channel transmission using the one or more channel parameters for the first physical-channel transmission to form a first demodulated signal for the payload; perform MIMO demodulation processing on the second physical-channel transmission using the one or more channel parameters for the second physical-channel transmission to form a second demodulated signal for the payload; and combine the first demodulated signal for the payload and the second demodulated signal for the payload at a Quadrature Amplitude Modulation (QAM) symbol level to determine the payload with increased accuracy.

In example 4, the subject matter of example 1, 3, or any of the examples described herein may further include that the one or more processors and memory are further configured to: perform Multiple Input Multiple Output (MIMO) demodulation processing on the first physical-channel transmission using the one or more channel parameters for the first physical-channel transmission to form a first demodulated signal for the payload; perform MIMO demodulation processing on the second physical-channel transmission using the one or more channel parameters for the second physical-channel transmission to form a second demodulated signal for the payload; and combine the first demodulated signal for the payload and the second demodulated signal for the payload at a soft bit level to determine the payload with increased accuracy.

In example 5, the subject matter of example 1, 2, 3, 4, or any of the examples described herein may further include that the first RS and the second RS are Demodulation Reference Signals (DMRSs), UE-specific Demodulation Reference Signals (UERSs), or Cell-specific Demodulation Reference Signals (CRSs).

In example 6, the subject matter of example 1, 2, 3, 4, 5, or any of the examples described herein may further include that the one or more processors and memory are further configured to: demodulate the first RS based on a first scrambling sequence corresponding to the first AP; and demodulate the second RS based on a second scrambling sequence corresponding to the second AP.

In example 7, the subject matter of example 1, 2, 3, 4, 5, 6, or any of the examples described herein may further include that the payload is a Physical Downlink Shared Channel (PDSCH) payload or an enhanced Physical Downlink Control Channel (ePDCCH) payload.

In example 8, the subject matter of example 1, 2, 3, 4, 5, 6, 7, or any of the examples described herein may further include that the one or channel parameters for the first physical-channel transmission or the one or more channel parameters for the second physical-channel transmission include at least one of: a delay shift, a Doppler shift, a delay spread, a Doppler spread, or a channel gain.

In example 9, the subject matter of example 1, 2, 3, 4, 5, 6, 7, 8, or any of the examples described herein may further include that the one or more processors and memory are further configured to process a Radio Resource Control (RRC) indicator received from an evolved Node B (eNB), the RRC indicator indicating that the UE is to calculate the one or more channel parameters for the first physical-channel transmission and the one or more channel parameters for the second physical-channel transmission separately based on a motion pattern of the UE.

In example 10, the subject matter of example 1, 2, 3, 4, 5, 6, 7, 8, 9, or any of the examples described herein may further include that the one or more processors include a baseband processor.

Example 11 includes an apparatus of an evolved node B (eNB) in a Single Frequency Network (SFN), the apparatus comprising one or more processors and memory configured to: identify a User Equipment (UE) that is moving through a coverage area of the SFN and is likely to experience unequal Doppler shifts for wireless transmissions sent from different transmission points in the SFN; send, via a first Remote Radio Head (RRH) using a first Antenna Port (AP) in the SFN, a first physical-channel transmission to the UE, wherein the first physical-channel transmission includes a payload assigned by the SFN and includes a first Reference Signal (RS); and send, via a second Remote Radio Head (RRH) using a second Antenna Port (AP) in the SFN, a second physical-channel transmission to the UE, wherein the second physical-channel transmission includes a the payload assigned by the SFN and includes a second Reference Signal (RS).

In example 12, the subject matter of example 11 or any of the examples described herein may further include that the first RS and the second RS are Demodulation Reference Signals (DMRSs), UE-specific Demodulation Reference Signals (UERSs) or Cell-specific Demodulation Reference Signals (CRSs).

In example 13, the subject matter of example 11, 12, or any of the examples described herein may further include that the payload is a Physical Downlink Shared Channel (PDSCH) payload or an enhanced Physical Downlink Control Channel (ePDCCH) payload.

In example 14, the subject matter of example 11, 12, 13, or any of the examples described herein may further include that the one or more processors and memory are further configured to send a Radio Resource Control (RRC) indicator to the UE, the RRC indicator indicating that the UE is to estimate one or more channel parameters for the first physical-channel transmission and one or more channel parameters for the second physical-channel transmission separately.

Example 15 includes a computer-readable medium (that may be non-transitory) containing instructions thereon that, when executed by one or more processors, perform the following: identifying a first physical-channel transmission, received at the UE, that was sent from a first Remote Radio Head (RRH) using a first Antenna Port (AP) in a Single Frequency Network (SFN), wherein the first physical-channel transmission includes a payload and includes a first Reference Signal (RS); identifying a second physical-channel transmission, received at the UE, that was sent from a second RRH using a second AP in the SFN, wherein the second physical-channel transmission includes the payload and includes a second RS; demodulating the first RS based on the first AP; demodulating the second RS based on the second AP; estimating one or more channel parameters for the first physical-channel transmission based on the first RS; estimating one or more channel parameters for the second physical-channel transmission based on the second RS; and demodulating the payload using at least one of: the one or more channel parameters for the first physical-channel transmission, or the one or more channel parameters for the second physical-channel transmission.

In example 16, the subject matter of example 15 or any of the examples described herein may further include that the computer-readable medium further contains instructions thereon that, when executed by the one or more processors, perform the following: determining that a channel link to the first RRH has a higher received power level than a channel link to the second RRH based on the one or more channel parameters for the first physical-channel transmission and based on the one or more channel parameters for the second physical-channel transmission; suppressing the channel link to the second RRH as interference; and demodulating the payload using the one or more channel parameters for the first physical-channel transmission.

In example 17, the subject matter of example 15 or any of the examples described herein may further include that the computer-readable medium further contains instructions thereon that, when executed by the one or more processors, perform the following: performing Multiple Input Multiple Output (MIMO) demodulation processing on the first physical-channel transmission using the one or more channel parameters for the first physical-channel transmission to form a first demodulated signal for the payload; performing MIMO demodulation processing on the second physical-channel transmission using the one or more channel parameters for the second physical-channel transmission to form a second demodulated signal for the payload; and combining the first demodulated signal for the payload and the second demodulated signal for the payload at a Quadrature Amplitude Modulation (QAM) symbol level to determine the payload with increased accuracy.

In example 18, the subject matter of example 15 or any of the examples described herein may further include that the computer-readable medium further contains instructions thereon that, when executed by the one or more processors, perform the following: performing Multiple Input Multiple Output (MIMO) demodulation processing on the first physical-channel transmission using the one or more channel parameters for the first physical-channel transmission to form a first demodulated signal for the payload; performing MIMO demodulation processing on the second payload signal using the one or more channel parameters for the second physical-channel transmission to form a second demodulated signal for the payload; and combining the first demodulated signal for the payload and the second demodulated signal for the payload at a soft bit level to determine the payload with increased accuracy.

In example 19, the subject matter of example 15, 16, 17, 18, or any of the examples described herein may further include that the first RS and the second RS are Demodulation Reference Signals (DMRSs), UE-specific Demodulation Reference Signals (UERSs) or Cell-specific Demodulation Reference Signals (CRSs).

In example 20, the subject matter of example 15, 16, 17, 18, 19, or any of the examples described herein may further include that the computer-readable medium further contains instructions thereon that, when executed by the one or more processors, perform the following: demodulating the first RS based on a first scrambling sequence corresponding to the first AP; and demodulating the second RS based on a second scrambling sequence corresponding to the second AP.

In example 21, the subject matter of example 15, 16, 17, 18, 19, 20, or any of the examples described herein may further include that the payload is a Physical Downlink Shared Channel (PDSCH) payload or an enhanced Physical Downlink Control Channel (ePDCCH) payload.

In example 22, the subject matter of example 15, 16, 17, 18, 19, 20, 21, or any of the examples described herein may further include that the one or channel parameters for the first physical-channel transmission or the one or more channel parameters for the second physical-channel transmission include at least one of: delay shift, Doppler shift, delay spread, Doppler spread, or channel gain.

In example 23, the subject matter of example example 15, 16, 17, 18, 19, 20, 21, 22, or any of the examples described herein may further include that the computer-readable medium further contains instructions thereon that, when executed by the one or more processors, perform the following: receiving, via the one or more antennas at the UE, a Radio Resource Control (RRC) indicator from an evolved Node B (eNB), the RRC indicator indicating that the UE is to calculate the one or more channel parameters for the first physical-channel transmission and the one or more channel parameters for the second physical-channel transmission separately based on a motion pattern of the UE.

Example 24 includes a means for receiving a payload in a Single Frequency Network (SFN), the means comprising: a means for identifying a first physical-channel transmission, received at the UE, that was sent from a first Remote Radio Head (RRH) using a first Antenna Port (AP) in a Single Frequency Network (SFN), wherein the first physical-channel transmission includes a payload and includes a first Reference Signal (RS); a means for identifying a second physical-channel transmission, received at the UE, that was sent from a second RRH using a second AP in the SFN, wherein the second physical-channel transmission includes the payload and includes a second RS; a means for demodulating the first RS based on the first AP; a means for demodulating the second RS based on the second AP; a means for estimating one or more channel parameters for the first physical-channel transmission based on the first RS; a means for estimating one or more channel parameters for the second physical-channel transmission based on the second RS; and a means for demodulating the payload using at least one of: the one or more channel parameters for the first physical-channel transmission, or the one or more channel parameters for the second physical-channel transmission.

In example 25, the subject matter of example 24 or any of the examples described herein may further comprise: a means for determining that a channel link to the first RRH has a higher received power level than a channel link to the second RRH based on the one or more channel parameters for the first physical-channel transmission and based on the one or more channel parameters for the second physical-channel transmission; a means for suppressing the channel link to the second RRH as interference; and a means for demodulating the payload using the one or more channel parameters for the first physical-channel transmission.

In example 26, the subject matter of example 24 or any of the examples described herein may further comprise: a means for performing Multiple Input Multiple Output (MIMO) demodulation processing on the first physical-channel transmission using the one or more channel parameters for the first physical-channel transmission to form a first demodulated signal for the payload; a means for performing MIMO demodulation processing on the second physical-channel transmission using the one or more channel parameters for the second physical-channel transmission to form a second demodulated signal for the payload; and a means for combining the first demodulated signal for the payload and the second demodulated signal for the payload at a Quadrature Amplitude Modulation (QAM) symbol level to determine the payload with increased accuracy.

In example 27, the subject matter of example 24 or any of the examples described herein may further comprise: a means for performing Multiple Input Multiple Output (MIMO) demodulation processing on the first physical-channel transmission using the one or more channel parameters for the first physical-channel transmission to form a first demodulated signal for the payload; a means for performing MIMO demodulation processing on the second payload signal using the one or more channel parameters for the second physical-channel transmission to form a second demodulated signal for the payload; and a means for combining the first demodulated signal for the payload and the second demodulated signal for the payload at a soft bit level to determine the payload with increased accuracy.

In example 28, the subject matter of example 24[00111] or any of the examples described herein may further include that the first RS and the second RS are Demodulation Reference Signals (DMRSs), UE-specific Demodulation Reference Signals (UERSs) or Cell-specific Demodulation Reference Signals (CRSs).

In example 29, the subject matter of example 24 or any of the examples described herein may further comprise: a means for demodulating the first RS based on a first scrambling sequence corresponding to the first AP; and a means for demodulating the second RS based on a second scrambling sequence corresponding to the second AP.

In example 30, the subject matter of example 24 or any of the examples described herein may further include that the payload is a Physical Downlink Shared Channel (PDSCH) payload or an enhanced Physical Downlink Control Channel (ePDCCH) payload.

In example 31, the subject matter of example 24 or any of the examples described herein may further include that the one or channel parameters for the first physical-channel transmission or the one or more channel parameters for the second physical-channel transmission include at least one of: delay shift, Doppler shift, delay spread, Doppler spread, or channel gain.

In example 32, the subject matter of example 24 or any of the examples described herein may further comprise: a means for receiving, via the one or more antennas at the UE, a Radio Resource Control (RRC) indicator from an evolved Node B (eNB), the RRC indicator indicating that the UE is to calculate the one or more channel parameters for the first physical-channel transmission and the one or more channel parameters for the second physical-channel transmission separately based on a motion pattern of the UE.

In example 33, the subject matter of example 1 or any of the examples described herein may include that the one or more processors and memory are further configured to: perform Multiple Input Multiple Output (MIMO) demodulation processing on the first physical-channel transmission using the one or more channel parameters for the first physical-channel transmission to form a first demodulated signal for the payload; perform MIMO demodulation processing on the second physical-channel transmission using the one or more channel parameters for the second physical-channel transmission to form a second demodulated signal for the payload; and combine the first demodulated signal for the payload and the second demodulated signal for the payload at a Quadrature Amplitude Modulation (QAM) symbol level or a soft bit level to determine the payload with increased accuracy.

In example 34, the subject matter of example 15 or any of the examples described herein may include that the computer-readable medium further contains instructions thereon that, when executed by the one or more processors, perform the following: performing Multiple Input Multiple Output (MIMO) demodulation processing on the first physical-channel transmission using the one or more channel parameters for the first physical-channel transmission to form a first demodulated signal for the payload; performing MIMO demodulation processing on the second physical-channel transmission using the one or more channel parameters for the second physical-channel transmission to form a second demodulated signal for the payload; and combining the first demodulated signal for the payload and the second demodulated signal for the payload at a Quadrature Amplitude Modulation (QAM) symbol level or at a soft bit level to determine the payload with increased accuracy.

Various techniques, or certain aspects or portions thereof, may take the form of program code (i.e., instructions) embodied in tangible media, such as floppy diskettes, compact disc-read-only memory (CD-ROMs), hard drives, transitory or non-transitory computer readable storage mediums, or any other machine-readable storage medium wherein, when the program code is loaded into and executed by a machine, such as a computer, the machine becomes an apparatus for practicing the various techniques. A non-transitory computer readable storage medium can be a computer readable storage medium that does not include signal. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a random-access memory (RAM), erasable programmable read only memory (EPROM), flash drive, optical drive, magnetic hard drive, solid state drive, or other medium for storing electronic data. The node and wireless device may also include a transceiver module (i.e., transceiver), a counter module (i.e., counter), a processing module (i.e., processor), and/or a clock module (i.e., clock) or timer module (i.e., timer). One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages may be added to the logical flow for enhanced utility, accounting, performance, measurement, troubleshooting, or other purposes.

As used herein, the word "or" indicates an inclusive disjunction. For example, as used herein, the phrase "A or B" represents an inclusive disjunction of exemplary conditions A and B. Hence, "A or B" is false only if both condition A is false and condition B is false. When condition A is true and condition B is also true, "A or B" is also true. When condition A is true and condition B is false, "A or B" is true. When condition B is true and condition A is false, "A or B" is true. In other words, the term "or," as used herein, should not be construed as an exclusive disjunction. The term "xor" is used where an exclusive disjunction is intended.

As used herein, the term processor can include general-purpose processors, specialized processors such as VLSI, FPGAs, and other types of specialized processors, as well as base-band processors used in transceivers to send, receive, and process wireless communications.

It should be understood that many of the functional units described in this specification have been labeled as modules, in order to more particularly emphasize their implementation independence. For example, a module can be implemented as a hardware circuit (e.g., an application-specific integrated circuit (ASIC)) comprising custom VLSI circuits or gate arrays, off-the-shelf semiconductors such as logic chips, transistors, or other discrete components. A module can also be implemented in programmable hardware devices such as field programmable gate arrays, programmable array logic, programmable logic devices or the like.

Modules can also be implemented in software for execution by various types of processors. An identified module of executable code can, for instance, comprise one or more physical or logical blocks of computer instructions, which can, for instance, be organized as an object, procedure, or function. Nevertheless, the executables of an identified module do not have to be physically located together, but can comprise disparate instructions stored in different locations which, when joined logically together, comprise the module and achieve the stated purpose for the module.

Indeed, a module of executable code can be a single instruction, or many instructions, and can even be distributed over several different code segments, among different programs, and across several memory devices. Similarly, operational data can be identified and illustrated herein within modules, and can be embodied in any suitable form and organized within any suitable type of data structure. The operational data can be collected as a single data set, or can be distributed over different locations including over different storage devices, and can exist, at least partially, merely as electronic signals on a system or network. The modules can be passive or active, including agents operable to perform desired functions.

As used herein, the term "processor" can include general purpose processors, specialized processors such as VLSI, FPGAs, and other types of specialized processors, as well as base band processors used in transceivers to send, receive, and process wireless communications.

Reference throughout this specification to "an example" means that a particular feature, structure, or characteristic described in connection with the example is included in at least one embodiment. Thus, appearances of the phrases "in an example" in various places throughout this specification are not necessarily all referring to the same embodiment.

As used herein, a plurality of items, structural elements, compositional elements, and/or materials can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and examples can be referred to herein along with alternatives for the various components thereof. It is understood that such embodiments, examples, and alternatives are not to be construed as de facto equivalents of one another, but are to be considered as separate and autonomous.

Furthermore, the described features, structures, or characteristics can be combined in any suitable manner in one or more embodiments. In the foregoing description, numerous specific details are provided, such as examples of layouts, distances, network examples, etc., to provide a thorough understanding of some embodiments. One skilled in the relevant art will recognize, however, that the some embodiments can be practiced without one or more of the specific details, or with other methods, components, layouts, etc. In other instances, well-known structures, materials, or operations are not shown or described in detail to avoid obscuring aspects of different embodiments.

While the forgoing examples are illustrative of the principles used in various embodiments in one or more particular applications, it will be apparent to those of ordinary skill in the art that numerous modifications in form, usage and details of implementation can be made without the exercise of inventive faculty, and without departing from the principles and concepts of the embodiments. Accordingly, it is not intended that the claimed matter be limited, except as by the claims set forth below.

What is claimed is:

1. An apparatus of a user equipment (UE) comprising one or more processors and memory configured to:
   identify a first physical-channel transmission, received at the UE, that was sent from a first Remote Radio Head (RRH) using a first Antenna Port (AP) in a Single Frequency Network (SFN), wherein the first physical-channel transmission includes a payload assigned by the SFN and includes a first Reference Signal (RS);
   identify a second physical-channel transmission, received at the UE, that was sent from a second RRH using a second AP in the SFN, wherein the second physical-channel transmission includes the payload assigned by the SFN and includes a second RS;
   demodulate the first RS based on the first AP;
   demodulate the second RS based on the second AP;
   estimate one or more channel parameters for the first physical-channel transmission based on the first RS;
   estimate one or more channel parameters for the second physical-channel transmission based on the second RS; and
   demodulate the payload using at least one of: the one or more channel parameters for the first physical-channel transmission or the one or more channel parameters for the second physical-channel transmission;
   determine that a channel link to the first RRH has a higher received power level than a channel link to the second RRH based on the one or more channel parameters for the first physical-channel transmission and based on the one or more channel parameters for the second physical-channel transmission;
   suppress the channel link to the second RRH as interference; and
   demodulate the payload using the one or more channel parameters for the first physical-channel transmission.

2. The apparatus of claim 1, wherein the one or more processors and memory are further configured to:
   perform Multiple Input Multiple Output (MIMO) demodulation processing on the first physical-channel transmission using the one or more channel parameters for the first physical-channel transmission to form a first demodulated signal for the payload;
   perform MIMO demodulation processing on the second physical-channel transmission using the one or more channel parameters for the second physical-channel transmission to form a second demodulated signal for the payload; and
   combine the first demodulated signal for the payload and the second demodulated signal for the payload at a Quadrature Amplitude Modulation (QAM) symbol level to determine the payload with increased accuracy.

3. The apparatus of claim 1, wherein the one or more processors and memory are further configured to:
   perform Multiple Input Multiple Output (MIMO) demodulation processing on the first physical-channel transmission using the one or more channel parameters for the first physical-channel transmission to form a first demodulated signal for the payload;
   perform MIMO demodulation processing on the second physical-channel transmission using the one or more channel parameters for the second physical-channel transmission to form a second demodulated signal for the payload; and
   combine the first demodulated signal for the payload and the second demodulated signal for the payload at a soft bit level to determine the payload with increased accuracy.

4. The apparatus of claim 1, wherein the first RS and the second RS are Demodulation Reference Signals (DMRSs), UE-specific Demodulation Reference Signals (UERSs), or Cell-specific Demodulation Reference Signals (CRSs).

5. The apparatus of claim 1, wherein the one or more processors and memory are further configured to:
   demodulate the first RS based on a first scrambling sequence corresponding to the first AP; and
   demodulate the second RS based on a second scrambling sequence corresponding to the second AP.

6. The apparatus of claim 1, wherein the payload is a Physical Downlink Shared Channel (PDSCH) payload or an enhanced Physical Downlink Control Channel (ePDCCH) payload.

7. The apparatus of claim 1, wherein the one or channel parameters for the first physical-channel transmission or the one or more channel parameters for the second physical-channel transmission include at least one of: a delay shift, a Doppler shift, a delay spread, a Doppler spread, or a channel gain.

8. The apparatus of claim 1, wherein the one or more processors and memory are further configured to process a Radio Resource Control (RRC) indicator received from an evolved Node B (eNB), the RRC indicator indicating that the UE is to calculate the one or more channel parameters for the first physical-channel transmission and the one or more channel parameters for the second physical-channel transmission separately based on a motion pattern of the UE.

9. The apparatus of claim 1, wherein the one or more processors include a baseband processor.

10. An apparatus of an evolved node B (eNB) in a Single Frequency Network (SFN), the apparatus comprising one or more processors and memory configured to:
    identify a User Equipment (UE) that is moving through a coverage area of the SFN and is likely to experience unequal Doppler shifts for wireless transmissions sent from different transmission points in the SFN;
    send, via a first Remote Radio Head (RRH) using a first Antenna Port (AP) in the SFN, a first physical-channel transmission to the UE, wherein the first physical-channel transmission includes a payload assigned by the SFN and includes a first Reference Signal (RS);
    send, via a second Remote Radio Head (RRH) using a second Antenna Port (AP) in the SFN, a second physical-channel transmission to the UE, wherein the second physical-channel transmission includes the payload assigned by the SFN and includes a second Reference Signal (RS),
    estimate one or more channel parameters for the first physical-channel transmission based on the first RS;
    estimate one or more channel parameters for the second physical-channel transmission based on the second RS, and
    determine that a channel link to the first RRH has a higher received power level than a channel link to the second RRH based on the one or more channel parameters for the first physical-channel transmission and based on the one or more channel parameters for the second physical-channel transmission;
    suppress the channel link to the second RRH as interference; and
    demodulate the payload using the one or more channel parameters for the first physical-channel transmission.

11. The apparatus of claim 10, wherein the first RS and the second RS are Demodulation Reference Signals (DMRSs), UE-specific Demodulation Reference Signals (UERSs) or Cell-specific Demodulation Reference Signals (CRSs).

12. The apparatus of claim 10, wherein the payload is a Physical Downlink Shared Channel (PDSCH) payload or an enhanced Physical Downlink Control Channel (ePDCCH) payload.

13. The apparatus of claim 10, wherein the one or more processors and memory are further configured to send a Radio Resource Control (RRC) indicator to the UE, the RRC indicator indicating that the UE is to estimate one or more channel parameters for the first physical-channel transmission and one or more channel parameters for the second physical-channel transmission separately.

14. A non-transitory computer-readable medium containing instructions thereon that, when executed by one or more processors, perform the following:
    identifying a first physical-channel transmission, received at a User Equipment (UE), that was sent from a first Remote Radio Head (RRH) using a first Antenna Port (AP) in a Single Frequency Network (SFN), wherein the first physical-channel transmission includes a payload and includes a first Reference Signal (RS);
    identifying a second physical-channel transmission, received at the UE, that was sent from a second RRH using a second AP in the SFN, wherein the second physical-channel transmission includes the payload and includes a second RS;
    demodulating the first RS based on the first AP;
    demodulating the second RS based on the second AP;
    estimating one or more channel parameters for the first physical-channel transmission based on the first RS;
    estimating one or more channel parameters for the second physical-channel transmission based on the second RS;
    demodulating the payload using at least one of: the one or more channel parameters for the first physical-channel transmission, or the one or more channel parameters for the second physical-channel transmission;
    performing Multiple Input Multiple Output (MIMO) demodulation processing on the first physical-channel transmission using the one or more channel parameters for the first physical-channel transmission to form a first demodulated signal for the payload;
    performing MIMO demodulation processing on the second physical-channel transmission using the one or more channel parameters for the second physical-channel transmission to form a second demodulated signal for the payload; and
    combining the first demodulated signal for the payload and the second demodulated signal for the payload at a Quadrature Amplitude Modulation (QAM) symbol level to determine the payload with increased accuracy.

15. The non-transitory computer-readable medium of claim 14, further containing instructions thereon that, when executed by the one or more processors, perform the following:
    determining that a channel link to the first RRH has a higher received power level than a channel link to the second RRH based on the one or more channel parameters for the first physical-channel transmission and based on the one or more channel parameters for the second physical-channel transmission;
    suppressing the channel link to the second RRH as interference; and
    demodulating the payload using the one or more channel parameters for the first physical-channel transmission.

16. The non-transitory computer-readable medium of claim 14, further containing instructions thereon that, when executed by the one or more processors, perform the following:
    performing Multiple Input Multiple Output (MIMO) demodulation processing on the first physical-channel transmission using the one or more channel parameters for the first physical-channel transmission to form a first demodulated signal for the payload;
    performing MIMO demodulation processing on the second payload signal using the one or more channel parameters for the second physical-channel transmission to form a second demodulated signal for the payload; and
    combining the first demodulated signal for the payload and the second demodulated signal for the payload at a soft bit level to determine the payload with increased accuracy.

17. The non-transitory computer-readable medium of claim 14, wherein the first RS and the second RS are Demodulation Reference Signals (DMRSs), UE-specific Demodulation Reference Signals (UERSs) or Cell-specific Demodulation Reference Signals (CRSs).

18. The non-transitory computer-readable medium of claim 14, further containing instructions thereon that, when executed by the one or more processors, perform the following:
    demodulating the first RS based on a first scrambling sequence corresponding to the first AP; and demodulating the second RS based on a second scrambling sequence corresponding to the second AP.

19. The non-transitory computer-readable medium of claim 14, wherein the payload is a Physical Downlink Shared Channel (PDSCH) payload or an enhanced Physical Downlink Control Channel (ePDCCH) payload.

20. The non-transitory computer-readable medium of claim 14, wherein the one or channel parameters for the first physical-channel transmission or the one or more channel parameters for the second physical-channel transmission include at least one of: delay shift, Doppler shift, delay spread, Doppler spread, or channel gain.

21. The non-transitory computer-readable medium of claim 14, further containing instructions thereon that, when executed by the one or more processors, perform the following:
    receiving, via the one or more antennas at the UE, a Radio Resource Control (RRC) indicator from an evolved Node B (eNB), the RRC indicator indicating that the UE is to calculate the one or more channel parameters for the first physical-channel transmission and the one or more channel parameters for the second physical-channel transmission separately based on a motion pattern of the UE.

* * * * *